US011525925B2

(12) United States Patent
Broumandan (10) Patent No.: US 11,525,925 B2
(45) Date of Patent: Dec. 13, 2022

(54) SYSTEM AND METHOD FOR DETECTING SPOOFING OF GLOBAL NAVIGATION SATELLITE SYSTEM SIGNALS USING A PLURALITY OF ANTENNAS

(71) Applicant: NovAtel Inc., Calgary (CA)

(72) Inventor: Ali Broumandan, Calgary (CA)

(73) Assignee: NovAtel Inc., Calgary (CA)

( * ) Notice: Subject to any disclaimer, the term of this patent is extended or adjusted under 35 U.S.C. 154(b) by 176 days.

(21) Appl. No.: 16/864,904

(22) Filed: May 1, 2020

(65) Prior Publication Data

US 2021/0341627 A1 Nov. 4, 2021

(51) Int. Cl.
| | |
|---|---|
| *G01S 19/21* | (2010.01) |
| *G01S 19/29* | (2010.01) |
| *G01S 19/44* | (2010.01) |
| *G06F 17/18* | (2006.01) |

(52) U.S. Cl.
CPC ............ *G01S 19/215* (2013.01); *G01S 19/29* (2013.01); *G01S 19/44* (2013.01); *G06F 17/18* (2013.01)

(58) Field of Classification Search
CPC ........ G01S 19/215; G01S 19/14; G01S 19/29; G01S 19/44; G06F 17/18
See application file for complete search history.

(56) References Cited

U.S. PATENT DOCUMENTS

| | | | |
|---|---|---|---|
| 11,092,716 B1 * | 8/2021 | Pust .................. | G01S 19/14 |
| 2019/0204451 A1 | 7/2019 | Boyer et al. | |

FOREIGN PATENT DOCUMENTS

EP    3627190 A1    3/2020

OTHER PUBLICATIONS

"European Search Report and Written Opinion," European Application No. 21171475.3-1216, Applicant: NovAtel Inc., dated Sep. 13, 2021, pp. 1-11.
Jahromi, Ali Jafarnia, et al., "GNSS Signal Authenticity Verification Using Carrier Phase Measurements with Multiple Receivers," IEEE, 2016 8th ESA Workshop on Satellite Navigation Technologies and European Workshop on GNSS Signals and Signal Processing (NAVITEC), Dec. 14, 2016, pp. 1-11.
Psiaki, Mark L., et al., "GNSS Spoofing and Detection," IEEE, Proceedings of the IEEE, New York, US, vol. 104, No. 6, Jun. 6, 2016, pp. 1258-1270.
Stenberg, Niklas, et al., "GNSS Spoofing Mitigation Using Multiple Receivers," IEEE, 2020 IEEE/ION Position, Location and Navigation Symposium (PLANS), Apr. 20, 2020, pp. 555-565.
Borio et al., "A Dual-antenna Spoofing Detection System Using GNSS Commercial", Receivers Proceedings of the 28th International Technical Meeting of The Satellite Division of the Institute of Navigation, Sep. 2015, 6 pages Pages.
Jahromi et al., "Double Antenna Approach toward Detection, Classification and Mitigation of GNSS Structural Interference", Navitec2014, Noordwijk, The Netherlands, 8 pages.

(Continued)

*Primary Examiner* — Bernarr E Gregory
*Assistant Examiner* — Fred H Mull
(74) *Attorney, Agent, or Firm* — Cesari and McKenna, LLP (57) ABSTRACT

A system and method for detecting spoofing of a Global Navigation Satellite System (GNSS) system using a plurality of antennas. Signals received by at least two of the plurality of antennas are authentication by use of one or more of a carrier phase authentication procedure, a signal power authentication procedure, and/or a channel distortion authentication procedure.

11 Claims, 11 Drawing Sheets

(56) References Cited

OTHER PUBLICATIONS

Jahromi, ""GNSS Signal Authenticity Verification Using Carrier Phase Measurements with Multiple Receivers"", 2016 IEEE, 11 pages.
Borio, Daniele, et al., "A Sum-of-Squares Approach to GNSS Spoofing Detection," IEEE, IEEE Transactions on Aerospace and Electronic Systems, vol. 52, No. 4, Aug. 2016, pp. 1756-1768.
Psiaki, Mark L., et al., "GNSS Spoofing and Detection," IEEE, Proceedings of the IEEE, vol. 104, Issue 6, Apr. 1, 2016, pp. 1-11.
Psiaki, Mark L., et al., "GNSS Spoofing Detection Using Two-Antenna Differential Carrier Phase," ION Institute of Navigation, Proceedings of the 27th International Technical Meeting of the Satellite Division of The institute of Navigation (ION GNSS+ 2014), Sep. 8-12, 2014, Tampa, Florida, USA, pp. 1-25.
Seo, Seong-Hun, et al., "Efficient Spoofing Identification Using Baseline Vector Information of Multiple Receivers," Springer, Springer-Verlag GmbH Germany, Springer Nature, GPS Solutions, Aug. 22, 2018, pp. 1-14.
Swaszek, Peter F., et al., "Spoof Detection Using Multiple COTS Receivers in Safety Critical Applications," The University of Rhode Island, Department of Electrical, Computer, and Biomedical Engineering Faculty Publications, Proceedings of Ion Gnss+ 2013, Nashville, TN, USA, Sep. 2013, pp. 1-11.
U.S. Appl. No. 17/166,371, filed Feb. 3, 2021 by Ali Broumandan for System and Method for Detecting Spoofing of Global Navigation Satellite System Signals Using a Single Antenna, pp. 1-32.
U.S. Appl. No. 17/522,382, filed Nov. 9, 2021 by Ali Broumandan for System and Method for Navigation System Spoofing Detection Using a Plurality of Antennas, pp. 1-33.

\* cited by examiner

SYSTEM AND METHOD FOR DETECTING SPOOFING OF GLOBAL NAVIGATION SATELLITE SYSTEM SIGNALS USING A PLURALITY OF ANTENNAS

BACKGROUND

Technical Field

The present relates to Global Navigation Satellite Systems (GNSS) and more particularly to the detection of spoofing attacks on GNSS systems.

Background Information

Global Navigation Satellite Systems (GNSS) are utilized for a variety of purposes, many of which have strict reliability requirements as they involve safety of life (SoL) services associated with critical missions such as aviation, maritime, and/or land transportation. For example, autonomous vehicle navigation requires accurate and precise positioning information to avoid the vehicle impacting with other vehicles, pedestrians, and/or structures. Similarly, navigating a vessel through a specified maritime channel requires accurate position information to avoid shallow areas, underwater wrecks, etc. Spoofing and/or jamming attacks on GNSS receivers have become a serious threat to these critical applications of GNSS position information.

As used herein, a jamming attack is generally defined as the broadcasting of signals on GNSS frequencies that overwhelm the legitimate GNSS signals and aim to prevent a GNSS receiver from determining a position. Similarly, as used herein, a spoofing attack is generally defined as the broadcasting of fake GNSS signals that are designed to cause a receiver to determine an incorrect position. Both attacks may occur simultaneously, i.e., spoofing signals may be transmitted with such a high power that they initially cause a receiver to lose tracking of the satellite signals, thereby resulting in a jamming attack. The spoofing signals may then be reduced in power so that the receiver locks onto the spoofing signal and utilizes the spoofing signal to calculate position.

It is desirous for GNSS receivers to be capable of identifying when a spoofing attack is occurring so that the GNSS receiver, or another component that is using the GNSS position information, may perform appropriate remediation. For example, if a receiver determines that it is receiving spoofed signals, it may cease to output position information, thereby preventing incorrect position information from being utilized in a manner that could cause harm. Additionally, should a receiver determine that it is being spoofed, appropriate countermeasures may be utilized to reduce the impact of the spoofer.

SUMMARY

The disadvantages of the prior art are overcome by providing a system and method for detecting spoofing of Global Navigation Satellite System (GNSS) systems using a plurality of antennas. A GNSS receiver that is connected to a plurality of antennas performs one or more authentication procedures using signals received at particular pairs of the plurality of antennas. Illustratively, the system may perform the authentication procedure using a variety of differing pairs of antennas for added accuracy and precision in determining whether received signals are spoofing signals or authentic signals.

In an illustrative embodiment, the received GNSS signals are utilized in one or more of a carrier phase-based authentication procedure, a signal power-based authentication procedure, and/or a channel distortion-based authentication procedure. Each of the procedures may be performed in any order, and/or may be performed in parallel.

In a carrier phase-based authentication procedure, in the spoofing case where all of the spoofing signals are transmitted from a single source, the phase difference between two spatially separated antennas will be the same and hence will result in a zero double difference of carrier phase measurements. However, authentic signals will arrive to the antennas from different directions, the phase difference between two antenna elements are different and as such will result in different double difference of carrier phase measurements for each pair of signals. In this exemplary method, the system calculates the double difference of the carrier phase measurements and determines if the double difference is greater than a predefined threshold. If it is, the procedure determines that the received signals are authentic.

In the signal power-based authentication procedure, the system calculates the double difference of the carrier-to-noise ratio ($C/N_0$). In the spoofing case, as all the PRNs are generated from a single source, all the PRNs are experiencing the same multipath channel and antenna gain pattern and hence the double difference of the $C/N_0$ will be around zero whereas in the authentic case each PRN experiences different paths and hence will have different double difference of the $C/N_0$ values. In this method, the calculated double difference is compared to a predefined threshold. If the double difference exceeds the predefined threshold, the system determines that the received signals are authentic.

In the next possible spoofing authentic signal classification method, the system calculates the double difference of the pseudorange measurements (PSR). In the spoofing case, as all spoofing PRNs are sourced from a single antenna, all the PRNs experience the same wireless channel distortion and hence the double difference of the PSR measurement will be around zero, whereas this is not the case for authentic signals. The calculated double difference is compared to a predefined threshold. If the double difference exceeds the predefined threshold, the system determines that the received signals are authentic.

In alternative embodiments, any of the described techniques may be used for signal authentication. Further, in alternative embodiments, should any of the authentication procedures determine that the signals are authentic, the remaining authentication procedures are not performed.

BRIEF DESCRIPTION OF THE DRAWINGS

The above and further advantages of the present invention are described herein in conjunction with the accompanying figures in which like reference numerals indicate identical or functionally similar elements, of which.

DETAILED DESCRIPTION OF AN ILLUSTRATIVE EMBODIMENT

Figure 1:
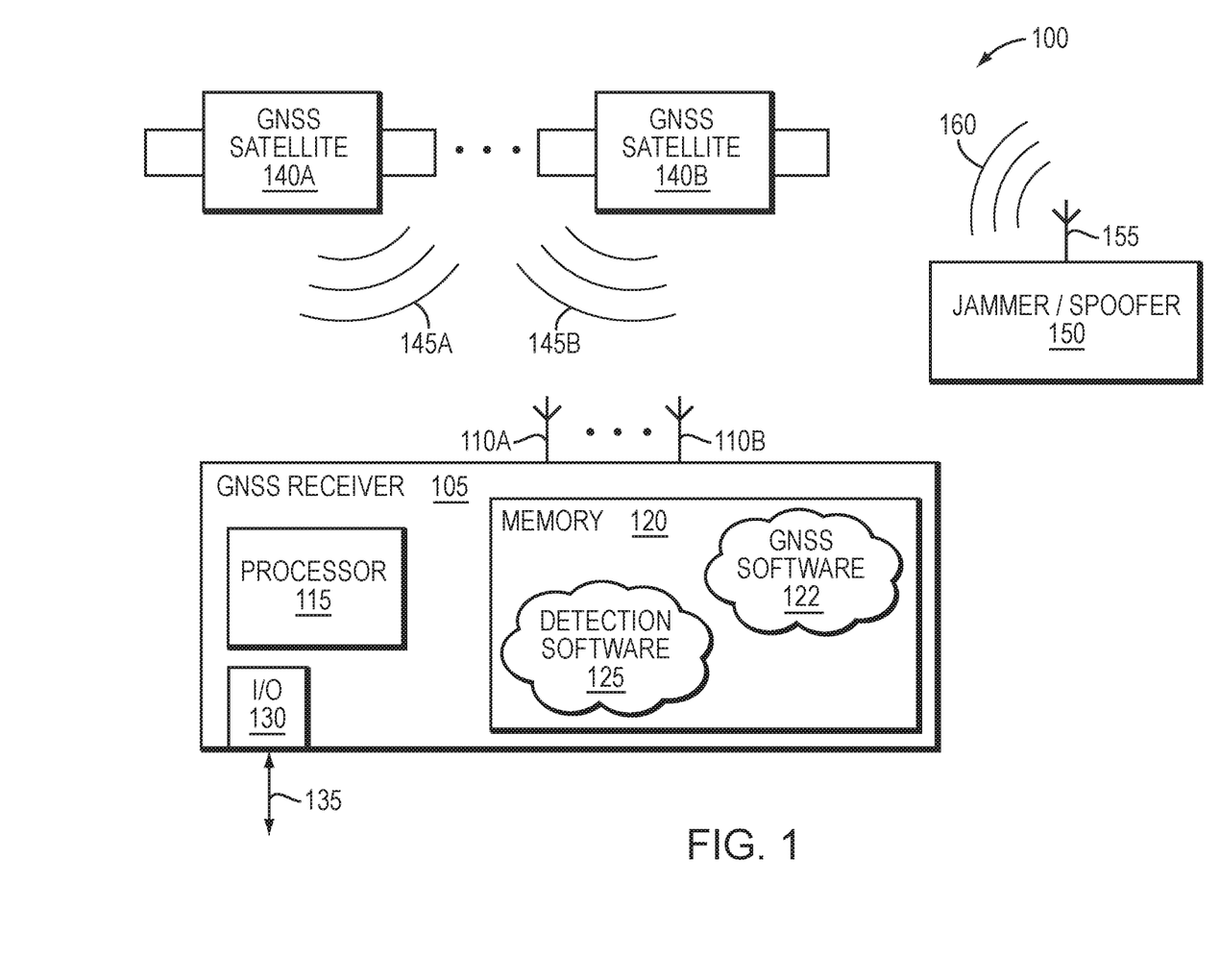
FIG. 1 is a schematic diagram of an exemplary Global Navigation Satellite System (GNSS) environment in accordance with an illustrative embodiment of the present invention.

FIG. 1 is a diagram of an exemplary Global Navigation Satellite System (GNSS) environment 100 in accordance with an illustrative embodiment of the present invention. Environment 100 illustratively comprises of a GNSS receiver 105, a plurality of GNSS satellites 140A,140B, and an exemplary jammer/spoofer 150.

A plurality of GNSS systems are currently in operation, e.g., GPS, GLONASS, BeiDou, and Galileo. The illustrative GNSS satellites 140 transmit exemplary GNSS signals 145. Typically, the GNSS satellites 140 broadcast the GNSS signals 145 on a plurality of frequencies, e.g., L1, L2, L5, etc. Illustratively, the carriers of signals 145 are modulated by ranging codes, which are pseudorandom noise (PRNs). A unique PRN is selected for transmission by each satellite, 140A, 140B. A satellite may change which PRN code it transmits over time, but only one satellite transmits a particular PRN code at a given time. GNSS signals 145 also include navigational data, which may include data on the satellite health status, ephemeris (i.e., satellite position and velocity), clock bias parameters, and an almanac giving data on all satellites in the GNSS constellation.

A typical GNSS receiver receives a composite signal consisting of several signals 145 transmitted by the satellites, as well as any noise and interfering signals, such as spoofing signal 160, described further below. A receiver may recover one of the transmitted signals 145 by correlating the composite received signal with a locally generated reference version of the PRN code signal assigned to the particular satellite of interest. If the locally generated PRN reference signal is properly timed, the digital data from that satellite may then be properly detected.

Exemplary jammer/spoofer 150 utilizes an antenna 155 to broadcast a set of spoofing signals 160. The spoofing signals 160 may modulate the carrier with information that conforms to a GNSS standard. However, the spoofing signals may include falsified PRNs and/or incorrect navigation data, e.g., almanac and/or ephemeris data. The purpose of spoofing signals 160 is to cause receiver 105 to determine an incorrect position and/or time. A determination of a position/time that is incorrect may have severe safety of life consequences if, e.g., a crash occurs due to the incorrect position. For example, in an aircraft navigation environment, spoofing signals 160 may cause a receiver 105 to determine an incorrect position. An aircraft relying on such incorrect position information may impact with terrain.

The illustrative receiver 105 includes one or more exemplary antennas 110A, B that are utilized by the receiver 105 for receiving GNSS signals 145A, B from the various GNSS satellites 140A, B. Further, if a jammer/spoofing 150 is broadcasting a spoofing signal 160, antennas 110 may also receive the spoofing signal 160. The antennas 110 may also receive other signals, such as interference, noise, etc. Illustratively, the receiver 105 receives GNSS signals 145 at antennas 110 and utilizes well-known techniques to calculate various navigation information including, e.g., position, velocity, etc.

In accordance with various illustrative embodiments of the present invention, a plurality of antennas 110 may be utilized. Illustratively, if more than two antennas 110 are utilized, the operations described below are performed on selected pairs of the antennas 110 in accordance with illustrative embodiments of the present invention. The techniques described below may be performed a plurality of times, using various pairs of antennas 110. For example, if three antennas 110A, 110B, and 110C (not shown) are connected to receiver 105, the procedure may be performed using 110A and 110B, then using 110A and 110C, and finally using 110B and 110C. In alternative embodiments, not every possible combination may be performed. Further, certain antennas may not receive the signals. It is expressly contemplated that any number of combinations may be utilized in accordance with alternative embodiments of the present invention. By performing the techniques below a plurality of times using differing pairs of antennas 110, a higher reliability determination may be obtained that a particular signal is not a spoofing signal and is authentic.

Receiver 105 illustratively comprises of a processor 115, a memory 120 and, in alternative embodiments, an input/output (I/O) module 130. In alternative embodiments, the receiver 105 may comprise additional components (not shown) to implement the functionality described herein in hardware. Such components may comprise, e.g., correlators, ASICs, FPGAs, etc. Therefore, the description of specific components described herein should be taken as exemplary only. As will be appreciated by those skilled in the art, received GNSS signals are typically amplified, down converted, filtered, and converted to a digital format. These functions may be performed in specialized hardware (not shown).

The processor 115 executes various software including exemplary detection software 125 that may be stored in memory 120. Exemplary detection software 125 implements the various spoofing detection techniques described herein in accordance with illustrative embodiments of the present invention. The detection software 125 may interact with GNSS software 122 that illustratively implements conventional position determination functionality. Illustratively, the GNSS software 122 may operate on the digital representation of the received GNSS signal.

The I/O module 130 may send/receive commands and/or navigation information over link 135. For example, I/O module 130 may communicate over link 135 with a control system for an autonomous vehicle to provide position and/or velocity information. It should be noted that in alternative embodiments, the functionality of I/O module 130 may be implemented using other components. For example, a user interface (UI) for receiver commands and/or calibration data may be utilized, while a separate data link is utilized to output position information.

It should be noted that while the exemplary receiver 105 is shown and described as having a processor 115 and memory 120, in alternative embodiments of the present invention, the various functionalities described herein may be implemented in other manners. For example, the functionality may be implemented in hardware, firmware, software, or in any combination thereof. Therefore, the description of the various illustrative embodiments of spoofing detection being implemented by operation of detection software 125 being executed by processor 115 should be taken as exemplary only.

As noted above, GNSS receivers are vulnerable to structural interference signals such as spoofing. The spoofing attack is illustratively based on a set of synthesized GNSS signals that causes receivers to generate incorrect position information. An exemplary spoofer 150 generate a plurality of GNSS signals and transmits them using antenna 155. As a single antenna 155 is used, the spoofing PRNs are spatially correlated as they experience the same propagation. Prior art techniques that utilize a plurality of antennas to authenticate received signals exist. However, a noted disadvantage of such authentication procedures is that they may take a significant amount of time, e.g., several minutes, to authenticate all the signals.

Figure 2:
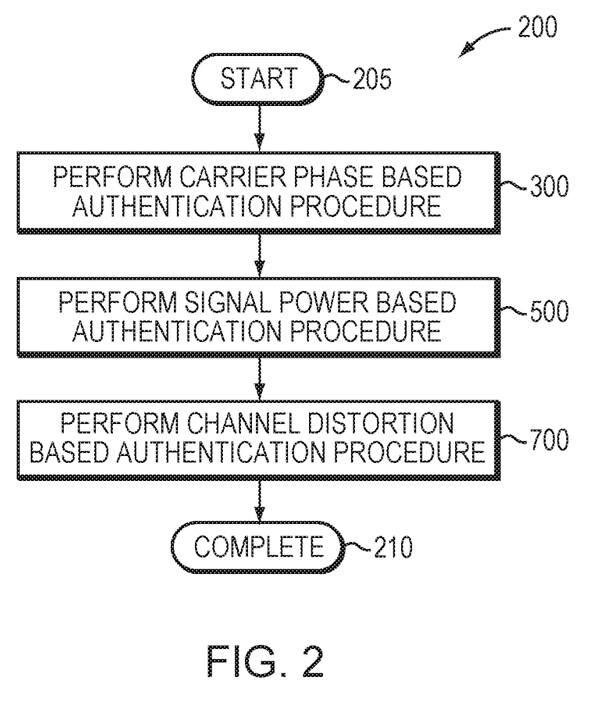
FIG. 2 is a flowchart detailing the steps of a procedure for performing spoofing detection using a plurality of antennas in accordance with an illustrative embodiment of the present invention.

FIG. 2 is a flowchart detailing the steps of an exemplary procedure 200 for implementing spoofing detection using a plurality of antennas in accordance with an illustrative embodiment the present invention. Illustratively, the procedure 200 is performed using a pair of signals received from two of the plurality of antennas 110. The procedure 200 begins in step 205 and continues to step 300 where a carrier phase-based authentication procedure is performed. Illustratively, the carrier phase-based authentication procedure of step 300 is described below in relation to FIG. 3. Once the carrier phase-based authentication procedure has been performed, the procedure continues to step 500 where a signal power-based authentication procedure is performed. Illustratively, the procedure of step 500 is described further below in relation to FIG. 5. A channel distortion-based authentication procedure is then performed in step 700. The channel distortion-based authentication procedure is described in relation to FIG. 7 below. The procedure 200 then completes in step 210.

It should be noted that while procedure 200 describes steps 300, 500, and 700 as occurring in a particular order, in accordance with various alternative embodiments of the present invention, the steps 300, 500, and 700 may be performed in any order. Further, in accordance with alternative embodiments of the present invention, steps 300, 500, 700 may be performed in parallel. Therefore, the description of steps occurring in a particular order should be taken as exemplary only. Further, in accordance with alternative embodiments of the present invention, not all of steps 300, 500, and 700 may be performed. For example, in an exemplary embodiment, only steps 300 and 700 may be performed. Similarly, in another exemplary embodiment, only steps 500 and 700 may be performed. Further, in accordance with an illustrative embodiment of the present invention, should any of the authentication procedures determine that a signal is a spoofing signal, the system may determine that the signal is a spoofing signal and not continue to perform the other authentication procedure. Similarly, if the signal is deemed to be authentic during any of the authentication procedures, the other procedures may not be performed and the signal deemed authentic. Therefore, the description of all three steps 300, 500, and 700 being performed should be taken as exemplary only.

Figure 3:
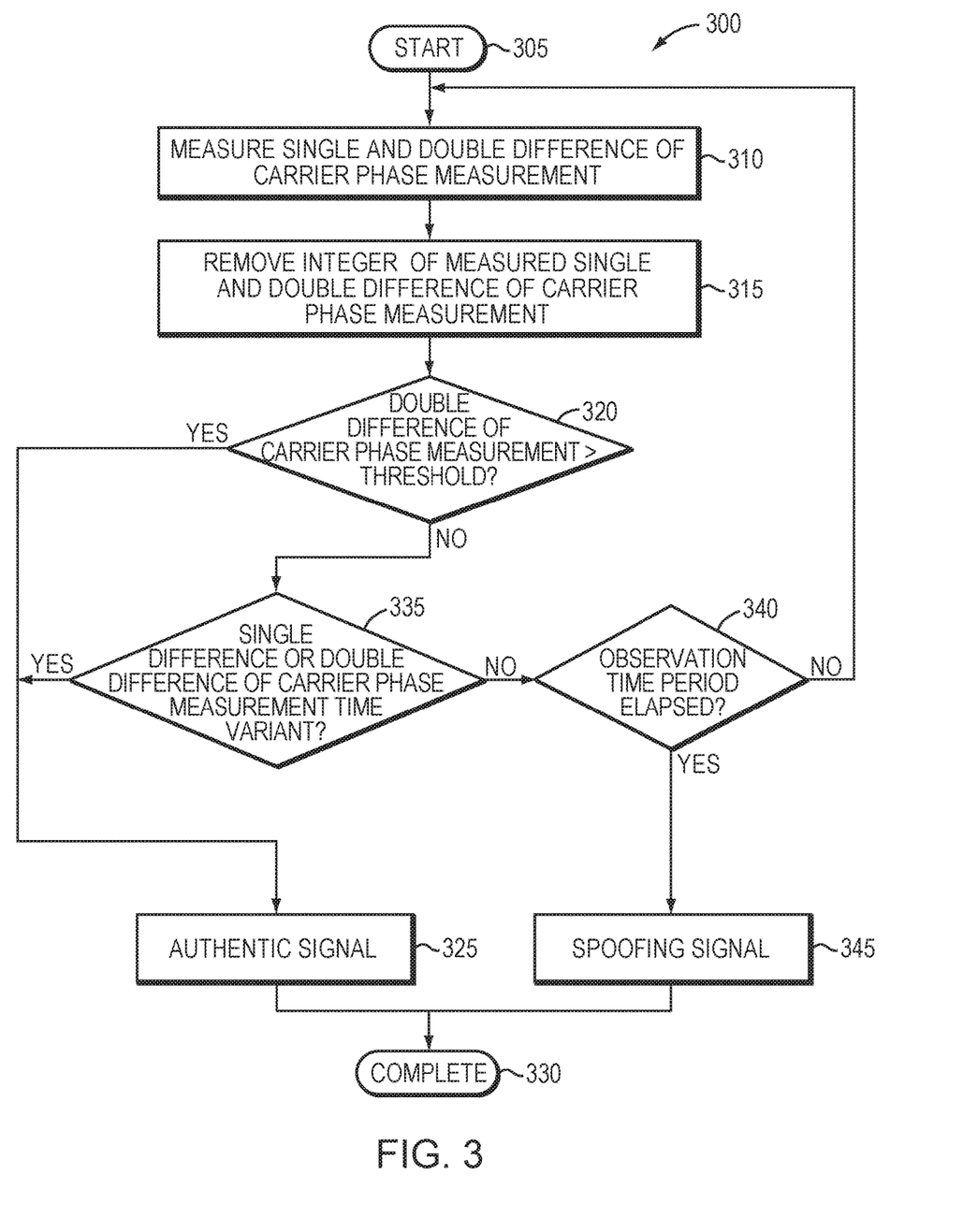
FIG. 3 is a flowchart detailing the steps of a procedure for performing carrier phase-based authentication in accordance with an illustrative embodiment of the present invention.

FIG. 3 is a flowchart detailing the steps of an exemplary carrier phase-based authentication procedure 300 in accordance with an illustrative embodiment of the present invention. As noted above, prior to the initiation of procedure 300, the receiver 105 will have received signals from two antennas 110. If there are more than two antennas, the signals received from two of the antennas will be utilized in performing procedure 300. The procedure 300 begins in step 305 and continues to step 310 where the single and double difference of the carrier phase measurements of the received signals from the pair of antennas are measured. As will be appreciated by those skilled in the art, measuring the single difference and the double difference of signals received from two antennas is well known in the art. The single and double differences may be calculated using conventional techniques as is well known to those skilled in the art. Then, in step 315, the integer part of the measured single and double difference of the carrier phase measurements are removed.

In step 320 determination is made whether the double difference of the carrier phase measurement exceeds a predefined threshold. As spoofing signals will typically have a double difference of their carrier phase measurements be equal to zero, the predefined threshold is typically set to a very small value, e.g., 0.05 cycle which is a function of the carrier phase measurements' standard deviation. However, in accordance with alternative embodiments of the present invention, other predefined thresholds may be utilized. Therefore, the description of a predefined threshold of 0.05 cycle should be taken as exemplary only. The predefined threshold may be set based on properties of the receiver 105, antennas 110, etc.

If the double difference of the carrier phase measurement does exceed the predefined threshold, the procedure branches to step 325 where the system determines that the signal is authentic. The procedure 300 then completes in step 330. In an exemplary implementation of procedure 200, the system may then continue to execute procedure 500. In alternative embodiments of the present invention, if the system determines that the signals are authentic in step 325, the remainder of procedure 200 may not be performed and the system will act on the authenticated signals.

If the double difference of the carrier phase measurement does not exceed the predefined threshold, the procedure begins an observation period that lasts a predefined amount of time. As part of this observation period, the procedure branches to step 335 where a determination is made whether a single difference of the carrier phase measurement is time variant in a static spoofing and receiver scenario or if a double difference of the carrier phase measurement is time variant. That is, a plurality of single and double differences of the carrier phase measurement are reviewed to determine if they vary over time. If the single or double difference of the carrier phase measurement is determined to be time variant, the procedure branches to step 325 and determines that the signal is authentic.

However, if in step 335 it is determined that the single or double difference of the carrier phase measurement are not time variant, the procedure branches to step 340 and determines if the predefined observation period has elapsed. Illustratively, the predetermined observation period is a function of the antenna spacing and may be up to a plurality of minutes to authenticate all PRNs of interest. However, in accordance with alternative embodiments of the present invention, the predetermined time period may vary. Therefore, the description of the system having an observation time period of, e.g., a plurality of minutes, should be taken as exemplary only.

If the observation time period has not elapsed, the procedure branches back to step 310 to measure the single and double difference of the carrier phase measurement. The procedure then continues on as described above.

However, if in step 340 it is determined that the observation time period has elapsed, the procedure branches to step 345 and determines that the signal is a spoofing signal. The procedure then completes in step 330.

More generally, if an initial determination in step 320 is made that the double difference of the carrier phase measurements does not exceed the predefined threshold, the system begins an observation time period. If the double difference of the carrier phase measurements do not exceed the predefined threshold or the single/double difference of the carrier phase measurements are not determined to be time variant within the observation time period, the system determines that the signals are spoofing signals. It should be noted that the determination of an authentic signal in step 325 or a spoofing signal in step 345 may be an intermediate determination. For example, if the determination is made that the signal is authentic in step 325, procedure 200 may still proceed from step 300 to step 500 to perform further tests to determine whether the signal is authentic or not. Therefore, the description of steps 325 or 345 determining that a signal is authentic or spoofing should be taken as exemplary only. In accordance with an illustrative embodiment of the present invention, a determination in step 345 that a signal is a spoofing signal may be determinative; however, determination that a signal is authentic in step 325 may only be advisory, subject to further determinations in steps 500 and/or 700 in accordance with various alternative embodiments of the present invention.

Figure 4A:
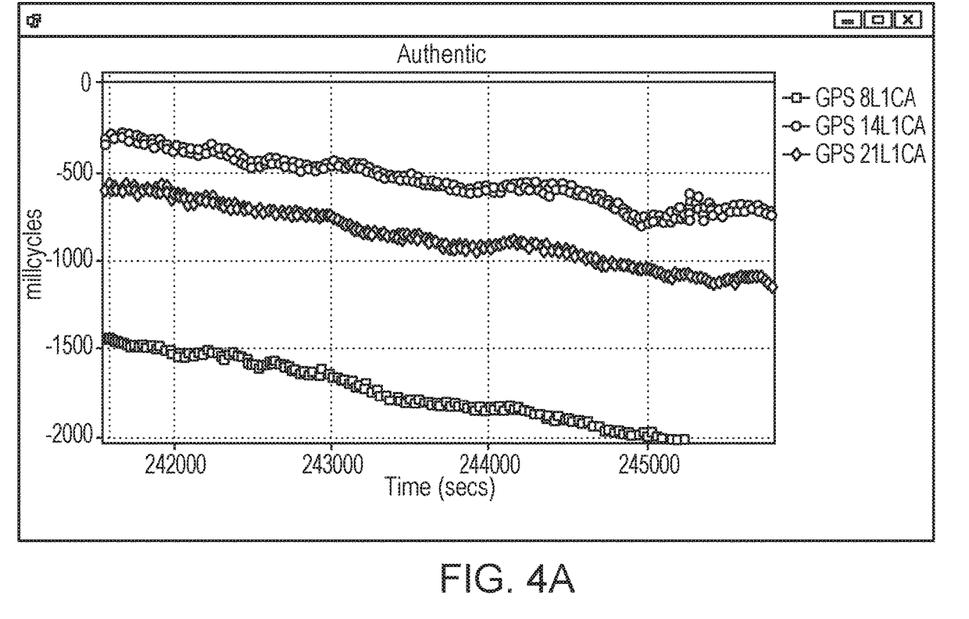
FIG. 4A is an exemplary graph illustrating a double differencing of carrier phase measurements in an authentic case in accordance with an illustrative embodiment of the present invention.
Figure 4B:
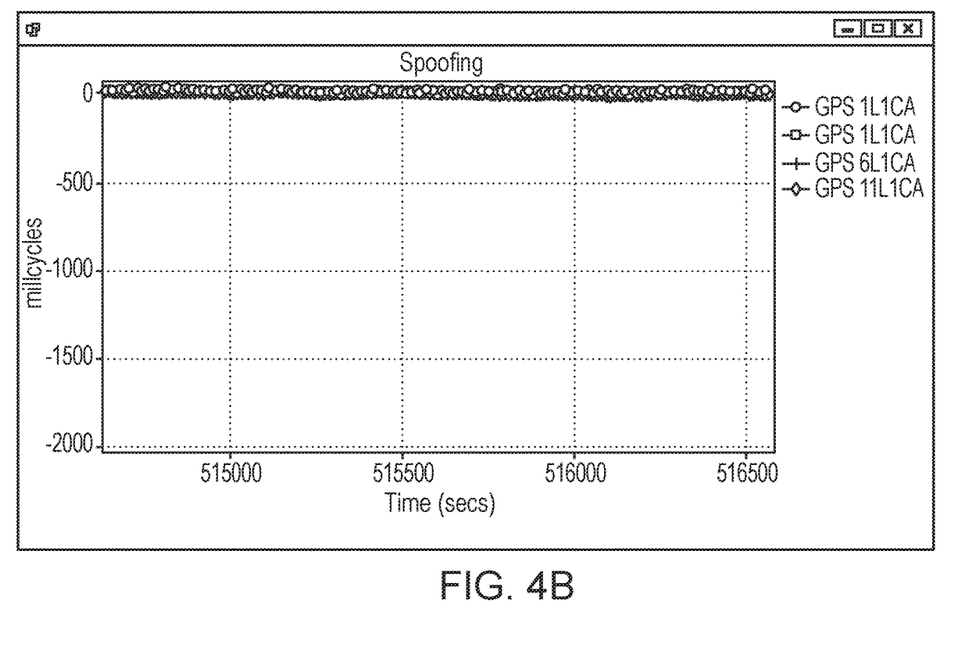
FIG. 4B is an exemplary graph illustrating a double differencing of carrier phase measurements in a spoofing case in accordance with an illustrative embodiment of the present invention.
Figure 4C:
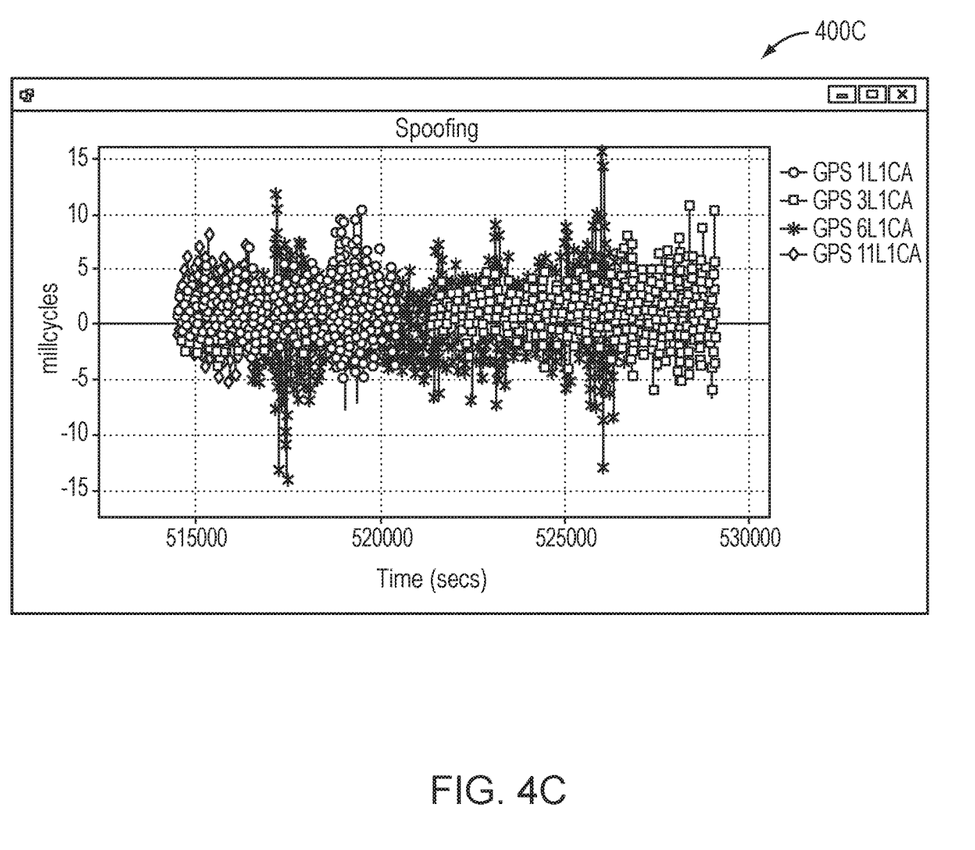
FIG. 4C is an exemplary graph illustrating a double differencing of carrier phase measurements in a spoofing case with an expanded scale to show differences in accordance with an illustrative embodiment of the present invention.

FIG. 4A is an exemplary graph 400A illustrating the double differencing of carrier phase measurements after removing the integer part for exemplary authentic signals in accordance with an illustrative embodiment of the present invention. Exemplary graph 400A illustrates three exemplary signals from an exemplary pair of antennas that are approximately 15 cm apart. As illustrated in graph 400A, the double differencing of carrier phase measurements vary over time for authentic signals. This is the result of the various authentic signals being transmitted over differing propagation pathways. This is in difference to FIG. 4B, which is an exemplary graph 400B illustrating the double differencing of carrier phase measurements in a spoofing case in accordance with an illustrative embodiment of the present invention. As can be seen in graph 400B, the double difference of carrier phase measurements of spoofing signals is substantially zero. This is due to the spoofing signals being transmitted from a single antenna, which results in each spoofing signal following the same propagation delay. FIG. 4C is an exemplary graph 400C illustrating a double differencing of carrier phase measurements in a spoofing case with an expanded scale to show differences in accordance with an illustrative embodiment of the present invention. Illustratively, graph 400C is an enlargement of graph 400B.

Figure 5:
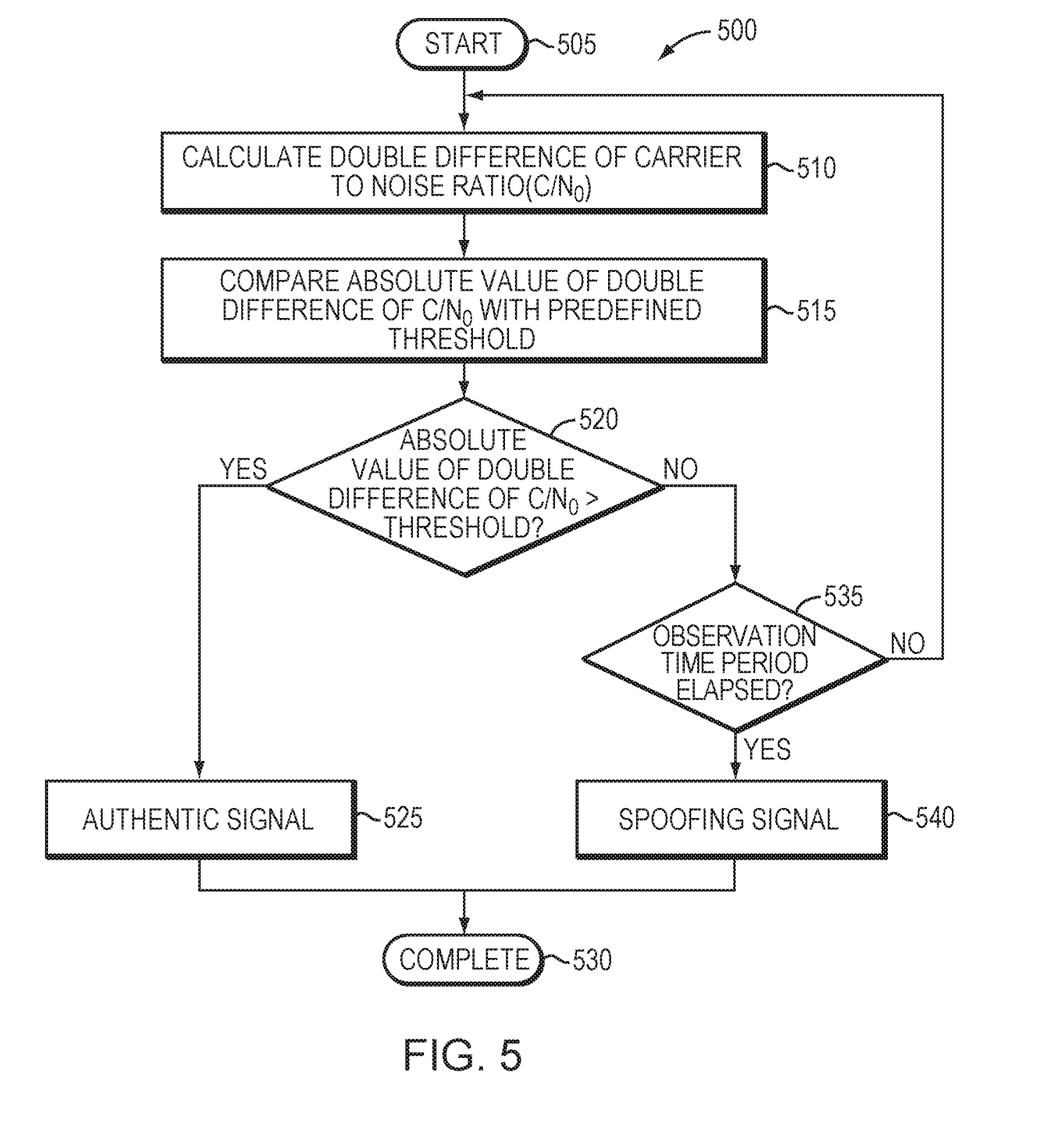
FIG. 5 is a flowchart detailing the steps of a procedure for performing signal power-based authentication in accordance with an illustrative embodiment of the present invention.

FIG. 5 is a flowchart detailing the steps of a carrier to noise ($C/N_0$) differentiation procedure 500 in accordance with an illustrative embodiment of the present invention. Similar to procedure 300, exemplary procedure 500 is performed using the signals received from two antennas. As noted, procedure 500 may be performed one or more times using differing combinations of a plurality of antennas in accordance with alternative embodiments of the present invention. The procedure 500 begins in step 505 and continues to step 510 where the double difference of the carrier to noise ratio ($C/N_0$) of the received signals is calculated. Obtaining the $C/N_0$ of the received signals may be performed using conventional techniques. Similarly, calculating the double difference of received signals' $C/N_0$ may also be performed using known procedures and systems.

The absolute value of the calculated double difference of the $C/N_0$ is compared with a predefined threshold in step 515. In accordance with an illustrative embodiment of the present invention, the predefined threshold may be in the range of 0.5-1 dB. However, in accordance with alternative embodiments of the present invention, the predefined threshold may vary. Therefore, the description of the predefined threshold being in the range of 0.5-1 dB should be taken as exemplary only.

A determination is made whether the absolute value of the double difference of the $C/N_0$ is greater than the predefined threshold in step 520. If it exceeds the predefined threshold, the procedure branches to step 525 and the system determines that the signal is authentic. The procedure 500 then completes in step 530.

However, if in step 520 it is determined that the double difference of the $C/N_0$ does not exceed the predetermined threshold, the systems begins an observation time period and branches to step 535 and determines in a predefined observation time period has elapsed. If the observation time period has not elapsed, the procedure branches back to step 510 and the procedure continues as described above.

However, if in step 535 it is determined that a predefined observation period has elapsed, the procedure branches to step 540 and determines that the signals are spoofing signals. The procedure 500 then completes in step 530.

Figure 6A:
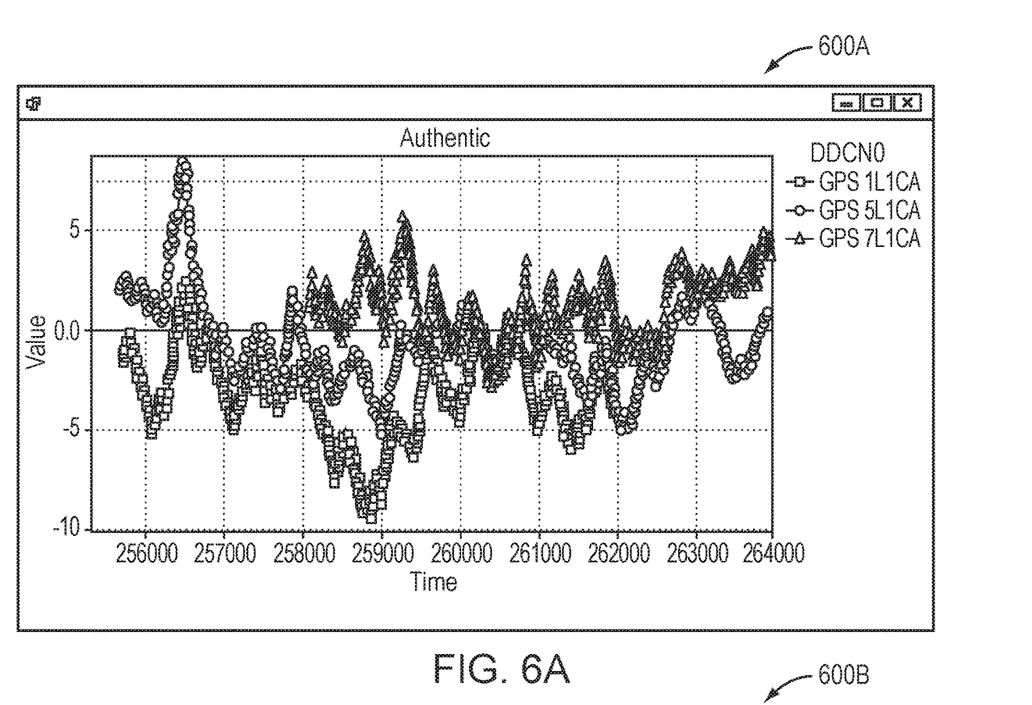
FIG. 6A is an exemplary graph illustrating a double differencing of carrier to noise ratio ($C/N_0$) measurements in an authentic case in accordance with an illustrative embodiment of the present invention.

FIG. 6A is an exemplary graph 600A illustrating a double differencing of carrier to noise ratio ($C/N_0$) measurements in an authentic case in accordance with an illustrative embodiment of the present invention. A can be seen in exemplary graph 600A, the $C/N_0$ of authentic signals vary substantially with time, for example from a high of 10 dB to a low of −10 dB. It should be noted that the graph 600A is exemplary and that other receivers using differing antennas may have substantially varied graphs. Graph 600A should be taken as an example of the variability of $C/N_0$ in authentic signals.

Figure 6B:
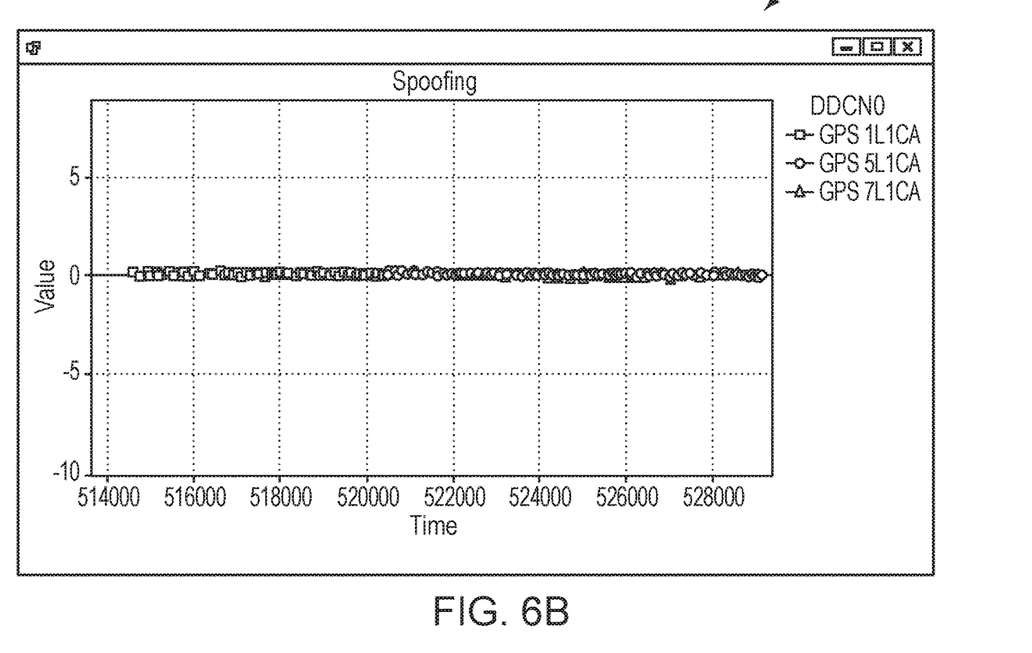
FIG. 6B is an exemplary graph illustrating a double differencing of carrier to noise ratio ($C/N_0$) measurements in a spoofing case in accordance with an illustrative embodiment of the present invention.
Figure 6C:
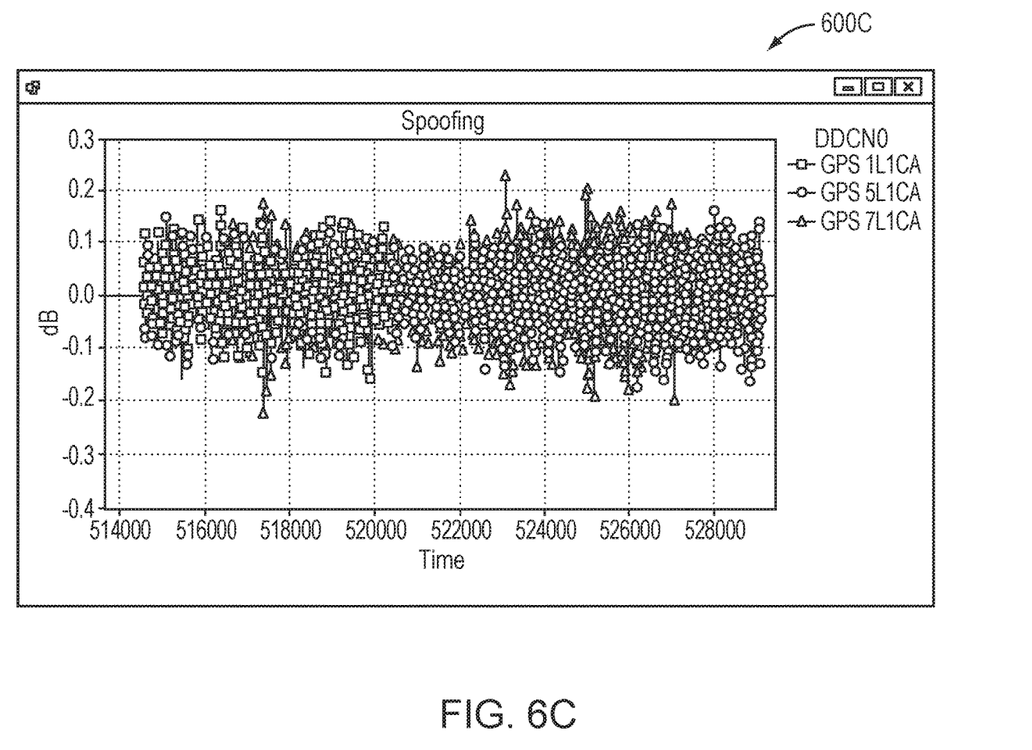
FIG. 6C is an exemplary graph illustrating a double differencing of carrier to noise ratio ($C/N_0$) measurements in a spoofing case with an expanded scale to show differences in accordance with an illustrative embodiment of the present invention.

FIG. 6B is an exemplary graph 600B illustrating a double differencing of carrier to noise ratio ($C/N_0$) measurements in a spoofing case in accordance with an illustrative embodiment of the present invention. FIG. 6C is an exemplary graph 600C illustrating a double differencing of carrier to noise ratio ($C/N_0$) measurements in a spoofing case with an expanded scale to show differences in accordance with an illustrative embodiment of the present invention. As can be seen in graphs 600B, C, in spoofing cases, the $C/N_0$ is substantially around zero and does not vary significantly over time. Illustrative embodiments of the present invention utilize this fact to identify that a signal is a spoofing signal.

Figure 7:
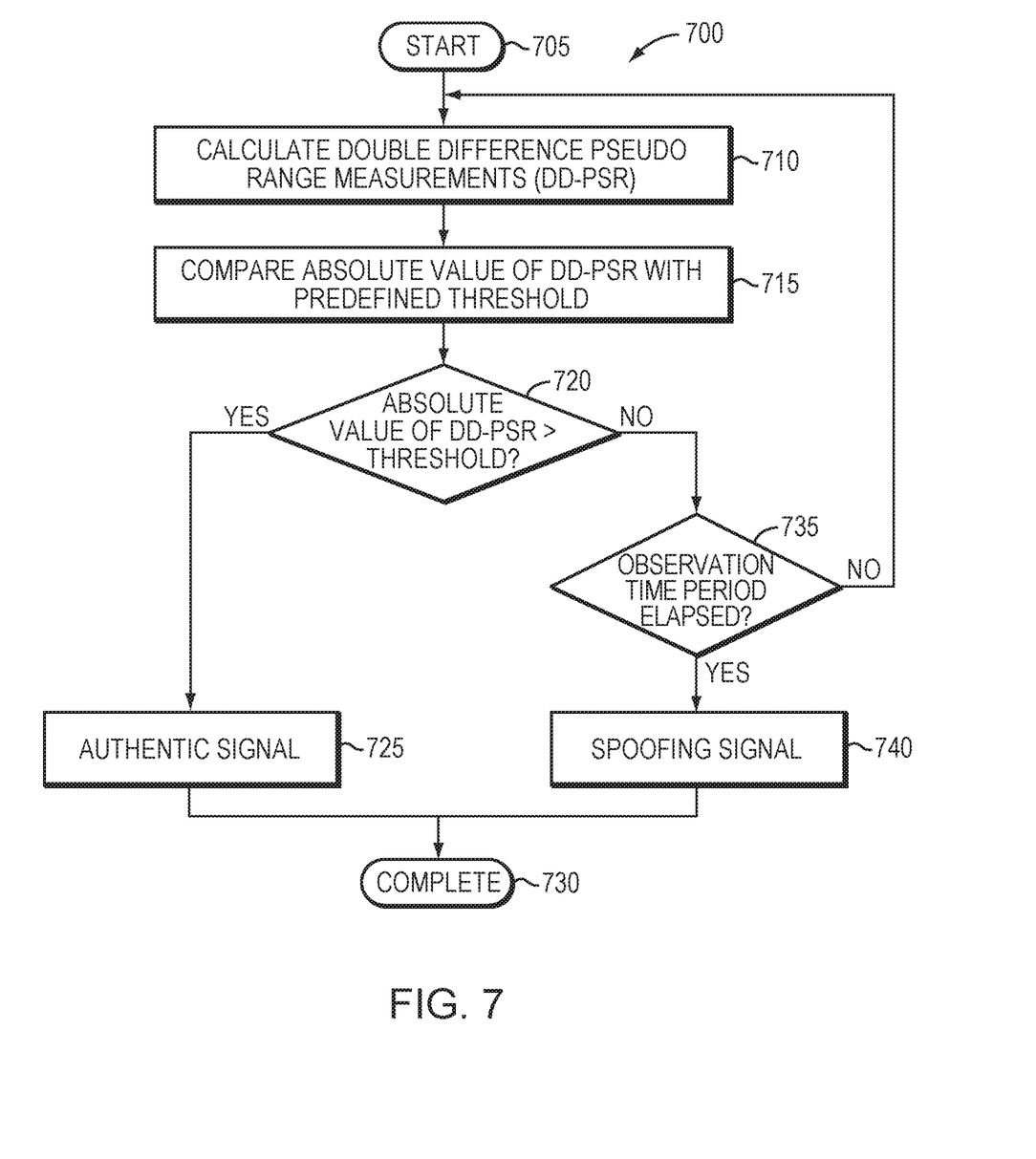
FIG. 7 is a flowchart detailing the steps of a procedure for performing channel distortion-based authentication in accordance with an illustrative embodiment of the present invention.

FIG. 7 is a flowchart detailing the steps of a procedure 700 for performing a pseudo-range measurement (PSR) authentication procedure in accordance with an illustrative embodiment of the present invention. Procedure 700 begins in step 705 and continues to step 710 where the double difference of the pseudo-range measurements (PSR) are calculated. This calculation may be performed using conventional techniques. The calculated double difference of the PSR are then compared to a predefined threshold in step 715. Illustratively, this predefined threshold may have a value of 0.5 m. However, in alternative embodiments, the predefined threshold may have varied values. Therefore, the description of a predefined threshold of 0.5 m should be taken as exemplary only.

A determination is made in step 720 whether the absolute value of the double difference of the PSR exceeds a predefined threshold. If the predefined threshold is exceeded, the procedure branches to step 725 and determines that the signal is authentic. The procedure 700 then completes in step 730.

However, if the double difference of the PSR does not exceed the predefined threshold in step 720, systems begins an observation time period and branches to step 735 to determine whether the observation time has elapsed. If the observation time has not elapsed, the procedure branches back to step 710 and continues as described above. However, if the observation time period has elapsed, in step 735, the procedure branches to step 740 and determines that the signal are spoofing signals. The procedure then completes in step 730.

Figure 8A:
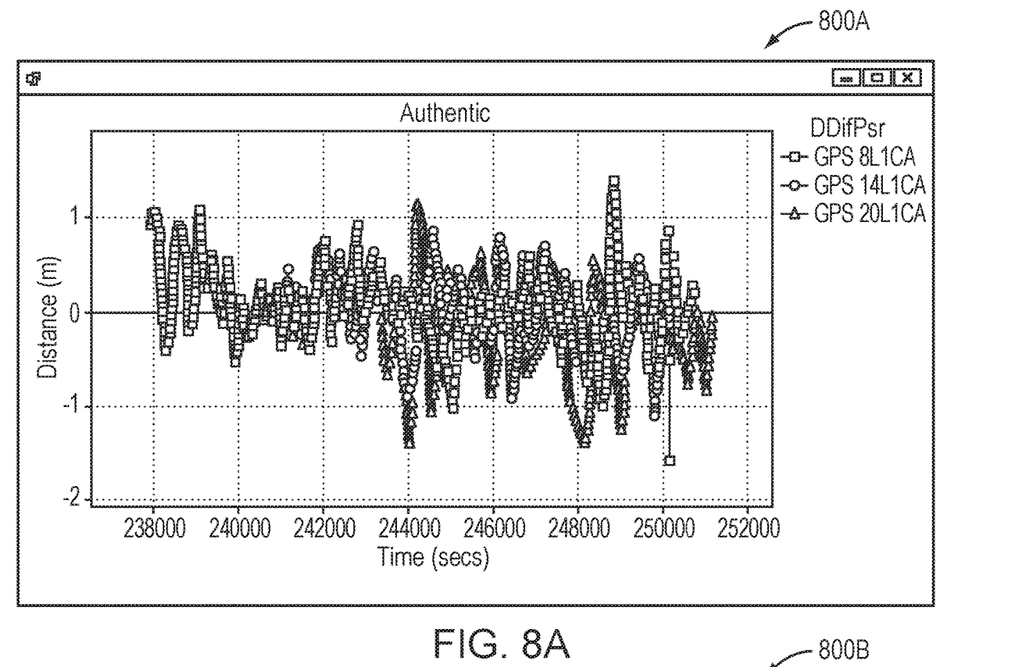
FIG. 8A is an exemplary graph illustrating a double differencing of pseudorange measurements in an authentic case in accordance with an illustrative embodiment of the present invention.

FIG. 8A is an exemplary graph 800A illustrating an exemplary double differencing of PSR in an authentic case in accordance with an illustrative embodiment of the present invention. As can be seen in graph 800A, the double difference of PSR has a variation that is significantly higher than that of the spoofing case as shown in FIG. 8B.

Figure 8B:
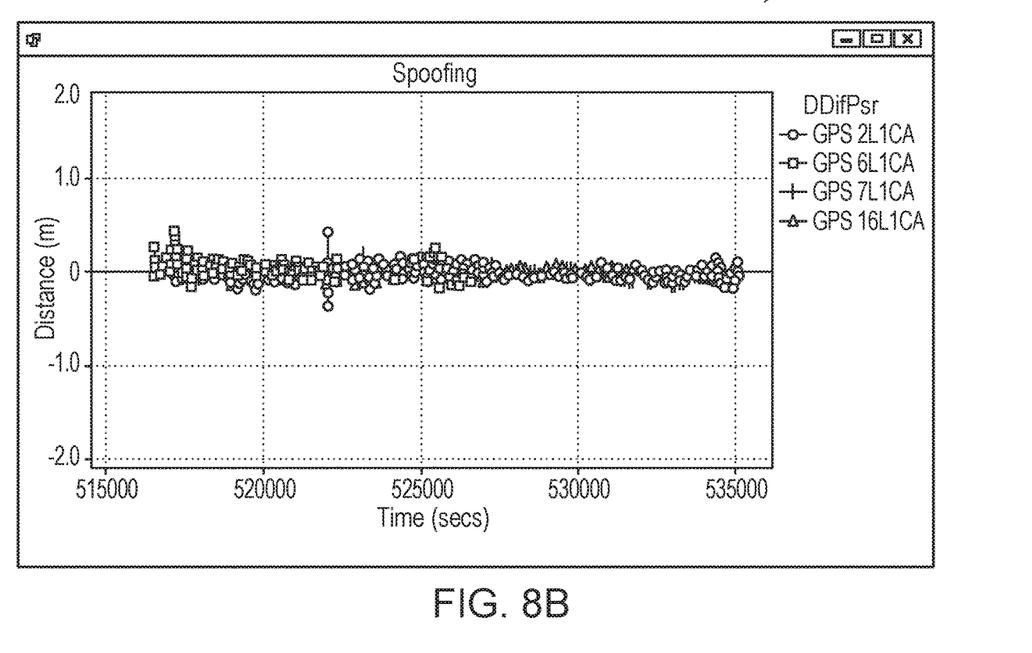
FIG. 8B is an exemplary graph illustrating a double differencing of pseudorange measurements in a spoofing case in accordance with an illustrative embodiment of the present invention.
Figure 8C:
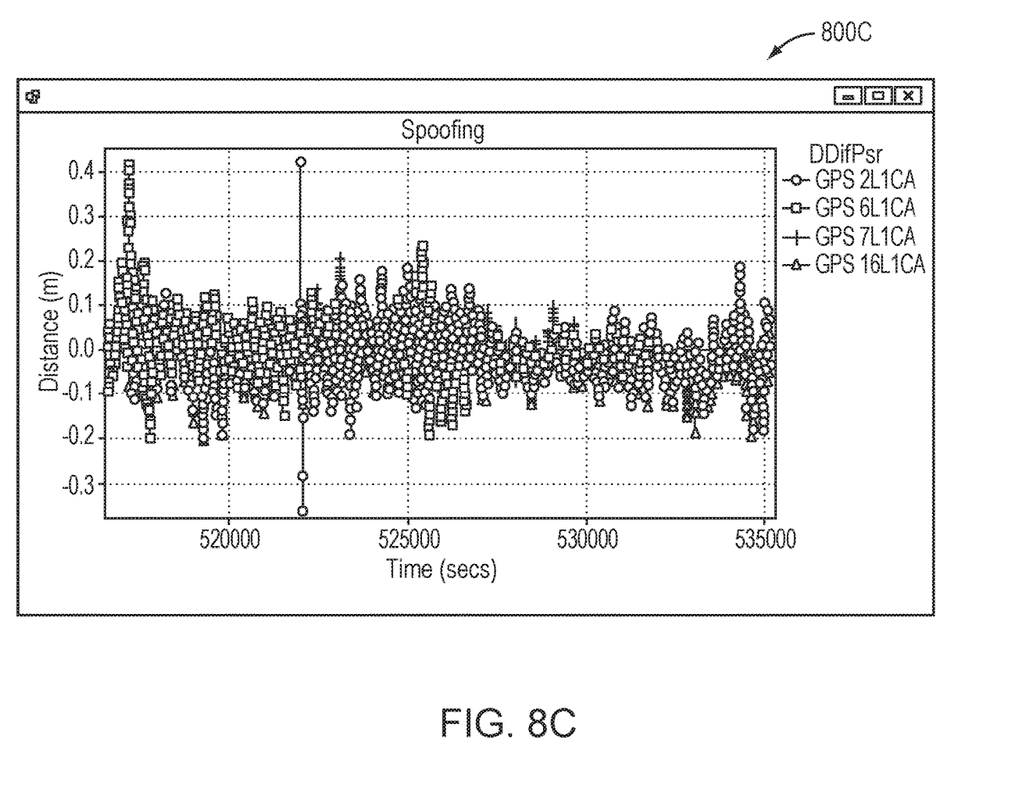
FIG. 8C is an exemplary graph illustrating a double differencing of pseudorange measurements in a spoofing case with an expanded scale to show differences in accordance with an illustrative embodiment of the present invention.

FIG. 8B is an exemplary graph illustrating a double differencing of PSR measurements in a spoofing case in accordance with an illustrative embodiment of the present invention. As can be seen in graph 800B, the double difference of PSR of spoofing signals is close to zero. This can be seen in FIG. 8C, which is an exemplary graph 800C that is an enlargement of graph 800B with the scale enlarged to show better detail.

It is expressly contemplated that a GNSS receiver 105 may implement one or more of the spoofer detection embodiments described herein in accordance with various illustrative embodiments of the present invention. The use of a plurality of metrics for determining whether a spoofing attack is occurring works to increase the accuracy of detection of spoofing attacks. This is especially true due to the increase sophistication of spoofers. Further, in a particular exemplary implementation, a receiver 105 may only implement portions of the disclosure herein due to design choices. For example, a system may only implement, e.g., procedure 300 and procedure 700, but not procedure 500 in accordance with an illustrative embodiment of the present invention. Further, it should be noted that exemplary embodiments have been described as comparing absolute values to predefined thresholds. It is expressly contemplated that in alternative embodiments, particular values (e.g., DD-PSR, etc.) may be compared to a threshold range. In such alternative embodiments, if the value is outside of the range, it is equivalent to exceeding a predefined threshold. Therefore, embodiments of the present invention should be construed to cover such implementations and not be limited to just using absolute values. The present invention has been described in relation to various illustrative embodiments. Therefore, it should be noted that the embodiments described herein should be viewed as exemplary and not limiting.

What is claimed is:

1. A computer implemented method, comprising the steps of:
   receiving Global Navigation Satellite System (GNSS) signals at a first antenna and a second antenna; and
   performing a signal power authentication procedure on the received GNSS signals, wherein the signal power authentication procedure comprises:
   calculating a first double difference value of a first carrier to noise ratio ($C/N_0$) of the GNSS signals,
   determining whether an absolute value of the first double difference value of the first ($C/N_0$) exceeds a predefined $C/N_0$ threshold; and
   in response to determining that the absolute value of the first double difference value of the first $C/N_0$ exceeds the predefined $C/N_0$ threshold, determining that the GNSS signals are authentic.

2. The computer implemented method of claim 1, further comprising:
   performing a carrier phase authentication procedure on the GNSS signals,
   wherein the carrier phase authentication procedure comprises:
   measuring a second double difference value of a first carrier phase measurement of the GNSS signals;
   removing an integer part of the second double difference value of the first carrier phase measurements of the GNSS signals;
   determining whether an absolute value of the second double difference value of the first carrier phase measurements exceeds a predefined carrier phase threshold; and
   in response to determining that the absolute value of the second double difference value of the first carrier phase measurement exceeds the predefined carrier phase threshold, determining that the GNSS signals are authentic.

3. The computer implemented method of claim 2, further comprising:
   in response to determining that the absolute value of the second double difference value of the first carrier phase measurements does not exceed the predefined carrier phase threshold, waiting a predefined time period;
   during the predefined time period, repeatedly:
   measuring, a third double difference value of a second carrier phase measurement of the GNSS signals;
   removing a second integer part of the third double difference value of the second carrier phase measurement;

determining whether an absolute value of the third double difference value of the second carrier phase measurement exceeds the predefined carrier phase threshold;

in response to determining that the absolute value of the third double difference value of the second carrier phase measurement exceeds the second predefined carrier phase threshold, determining that the GNSS signals are authentic; and upon the predefined time period elapsing without determining that the absolute value of the third double difference value of the second carrier phase measurement exceeds the predefined carrier phase threshold, determining that the GNSS signals are spoofing signals.

4. The computer implemented method of claim 2, wherein the predefined carrier phase threshold is a function of a standard deviation of carrier phase measurements under a spoofing case to satisfy a level of probability of false detection.

5. The computer implemented method of claim 1, wherein the first antenna and the second antenna are selected from a plurality of antennas associated with a single GNSS receiver.

6. The computer implemented method of claim 1, further comprising:

in response to determining that the absolute value of the first double difference value of the first $C/N_0$ does not exceed the predefined C/N0 threshold, waiting a predefined time period;

during the predefined time period, repeatedly:
measuring a second double difference value of a second $C/N_0$ of the received GNSS signals;
determining whether an absolute value of the second double difference value of the second $C/N_0$ exceeds the predefined $C/N_0$ threshold;
in response to determining that the absolute value of the second double difference value of the second $C/N_0$ exceeds the predefined $C/N_0$ threshold, determining that the GNSS signals are authentic; and
upon the predefined time period elapsing without determining that the absolute value of the second double difference value of the second $C/N_0$ exceeds the predefined $C/N_0$ threshold, determining that the GNSS signals are spoofing signals.

7. The computer implemented method of claim 1, wherein the predefined $C/N_0$ threshold is a function of a standard deviation of $C/N_0$ measurements under a spoofing case to satisfy a desired probability of false detection.

8. The computer implemented method of claim 1, wherein the predefined $C/N_0$ threshold is a function of a standard deviation of pseudorange measurements under a spoofing case to satisfy a desired probability of false detection.

9. The computer implemented method of claim 1, further comprising:

performing a channel distortion authentication procedure, wherein the channel distortion authentication procedure comprises:
measuring a second double difference value of a first pseudorange measurement of the GNSS signals;
determining whether an absolute value of the second double difference value of the first pseudorange measurement exceeds a predefined pseudorange threshold; and
in response to determining that the second double difference value of the first pseudorange measurement exceeds the predefined pseudorange threshold, determining that the GNSS signals are authentic.

10. The computer implemented method of claim 9, further comprising:

in response to determining that the absolute value of the second double difference value of the first pseudorange measurement does not exceed the predefined pseudorange threshold, waiting a predefined time period;

during the predefined time period, repeatedly:
measuring a third double difference value of second pseudorange measurement of the GNSS signals;
determining whether the third double difference value of the second pseudorange measurement exceeds the predefined pseudorange threshold; and
in response to determining that the third double difference value of the second pseudorange measurement exceeds the predefined pseudorange threshold, determining that the GNSS signals are authentic; and
upon the predefined time period elapsing without determining that the absolute value of the third difference of the second pseudorange measurement exceeds the predefined pseudorange threshold, determining that the GNSS signals are spoofing signals.

11. The computer implemented method of claim 9, wherein the predefined pseudorange threshold is a function of a standard deviation of pseudorange measurements under a spoofing case to satisfy a desired probability of false detection.

* * * * *